United States Patent
Zhang et al.

(10) Patent No.: US 9,789,663 B2
(45) Date of Patent: Oct. 17, 2017

(54) DEGRADABLE METAL COMPOSITES, METHODS OF MANUFACTURE, AND USES THEREOF

(71) Applicants: Zhihui Zhang, Katy, TX (US); Zhiyue Xu, Cypress, TX (US)

(72) Inventors: Zhihui Zhang, Katy, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 143 days.

(21) Appl. No.: 14/151,081

(22) Filed: Jan. 9, 2014

(65) Prior Publication Data

US 2015/0190984 A1    Jul. 9, 2015

(51) Int. Cl.

| | | |
|---|---|---|
| B32B 15/00 | (2006.01) |
| B32B 15/01 | (2006.01) |
| B22F 7/00 | (2006.01) |
| B22F 7/02 | (2006.01) |
| C22C 21/00 | (2006.01) |
| C22C 21/02 | (2006.01) |
| C22C 21/06 | (2006.01) |
| C22C 21/08 | (2006.01) |
| C22C 21/10 | (2006.01) |
| C22C 21/12 | (2006.01) |
| C22C 21/16 | (2006.01) |
| C22C 23/00 | (2006.01) |
| C22C 23/02 | (2006.01) |
| C22C 23/04 | (2006.01) |
| B22F 1/02 | (2006.01) |

(52) U.S. Cl.
CPC ............ *B32B 15/01* (2013.01); *B22F 7/008* (2013.01); *B22F 7/02* (2013.01); *B32B 15/013* (2013.01); *C22C 21/00* (2013.01); *C22C 21/02* (2013.01); *C22C 21/06* (2013.01); *C22C 21/08* (2013.01); *C22C 21/10* (2013.01); *C22C 21/12* (2013.01); *C22C 21/16* (2013.01); *C22C 23/00* (2013.01); *C22C 23/02* (2013.01); *C22C 23/04* (2013.01); *B22F 1/02* (2013.01); *Y10T 428/12708* (2015.01); *Y10T 428/12729* (2015.01)

(58) Field of Classification Search
None
See application file for complete search history.

(56) References Cited

U.S. PATENT DOCUMENTS

| | | |
|---|---|---|
| 5,223,347 A | 6/1993 | Lhymn et al. |
| 8,211,247 B2 | 7/2012 | Marya et al. |
| 8,535,604 B1 | 9/2013 | Baker et al. |
| 2003/0175543 A1 | 9/2003 | Lo |

(Continued)

OTHER PUBLICATIONS

International Search Report and Written Opinion; International Application No. PCT/US2014/069080; International Filing Date: Dec. 8, 2014; dated Mar. 19, 2015; 16 pages.

*Primary Examiner* — Daniel J Schleis
(74) *Attorney, Agent, or Firm* — Cantor Colburn LLP (57) ABSTRACT

A metal composite comprises: a first matrix comprising magnesium, a magnesium alloy, or a combination thereof; a second matrix comprising aluminum, an aluminum alloy, steel, a zinc alloy, a tin alloy, or a combination comprising at least one of the foregoing; a corrosion reinforcement material; and a boundary layer disposed between the first matrix and the second matrix; wherein the boundary layer has a thickness of 10 nm to 200 μm.

27 Claims, 7 Drawing Sheets

(56) References Cited

U.S. PATENT DOCUMENTS

| | | |
|---|---|---|
| 2010/0116471 A1 | 5/2010 | Reppel et al. |
| 2012/0103135 A1* | 5/2012 | Xu .......................... B22F 1/02 |
| | | 75/233 |
| 2013/0152739 A1 | 6/2013 | Li et al. |

* cited by examiner

DEGRADABLE METAL COMPOSITES, METHODS OF MANUFACTURE, AND USES THEREOF

BACKGROUND

Oil and natural gas, or Carbon Dioxide sequestration wells often utilize wellbore components or tools that, due to their function, are only required to have limited service lives that are considerably less than the service life of the well. After a component or tool service function is complete, it must be removed or disposed of in order to recover the original size of the fluid pathway for use, including hydrocarbon production, $CO_2$ sequestration, etc.

Disposal of components or tools has conventionally been done by milling or drilling the component or tool out of the wellbore. Recently, the removal of components or tools by dissolution of degradable materials has also been proposed in order to eliminate the need for milling or drilling operations.

Despite all the advances, the development of new materials that can be used to form wellbore components and tools having the mechanical properties necessary to perform their intended function and then removed from the wellbore by milling or by controlled dissolution using wellbore fluids is still very desirable. It would be a further advantage if the materials could be readily machined to provide design-friendly geometries.

SUMMARY

A metal composite comprises: a first matrix comprising magnesium, a magnesium alloy, or a combination thereof; a second matrix comprising aluminum, an aluminum alloy, steel, a zinc alloy, a tin alloy, or a combination comprising at least one of the foregoing; a corrosion reinforcement material; and a boundary layer disposed between the first matrix and the second matrix; wherein the boundary layer has a thickness of 10 nm to 200 µm.

A method of making a metal composite comprises: dispersing a corrosion reinforcement material in a first metallic component, a second metallic component or both; wherein the first metallic component comprises a plurality of particles of magnesium, a magnesium alloy, or a combination thereof; and the second metallic component comprises a plurality of particles of aluminum, an aluminum alloy, steel, a zinc alloy, a tin alloy, or a combination comprising at least one of the foregoing; combining the first metallic component with the second metallic component; and applying a predetermined temperature to the combination thereby forming the metal composite.

Another method of making a metal composite comprises: coating a first metallic component, a second metallic component, or both with a corrosion reinforcement material; wherein the first metallic component comprises a plurality of particles of magnesium, a magnesium alloy, or a combination thereof; and the second metallic component comprises a plurality of particles of aluminum, an aluminum alloy, steel, a zinc alloy, a tin alloy, or a combination comprising at least one of the foregoing; combining the first metallic component with the second metallic component; and applying a predetermined temperature to the combination thereby forming the metal composite.

Articles comprising the metal composites are also disclosed.

BRIEF DESCRIPTION OF THE DRAWINGS

Referring now to the drawings wherein like elements are numbered alike:

FIG. 3($a$) is an electron photomicrograph of an exemplary embodiment of a metal composite; and FIG. 3($b$) is an enlarged view of the interface between matrix 1 and matrix 2 of the metal composite of FIG. 3($a$);

FIG. 4($a$) is an electron photomicrograph of another exemplary embodiment of a metal composite; and FIG. 4($b$) is an enlarged view of the interface between matrix 1 and matrix 2 of the metal composite of FIG. 4($b$);

FIG. 5($a$) is an electron photomicrograph of a metal composite formed without heat treatment; and FIG. 5($b$) is an electron photomicrograph of a metal composite formed with heat treatment;

DETAILED DESCRIPTION

Disclosed herein are metal composites that may be used in a wide variety of applications and application environments, including use in various wellbore environments to make various selectably and controllably disposable or degradable downhole tools or other downhole components. These metal composites include a first matrix comprising magnesium, a magnesium alloy, or a combination thereof; a second matrix comprising aluminum, an aluminum alloy, steel, a zinc alloy, a tin alloy, or a combination comprising at least one of the foregoing; a corrosion reinforcement material; and a boundary layer disposed between the first matrix and the second matrix; wherein the boundary layer has a thickness of 10 nm to 200 µm.

The metal composites provide a unique and advantageous combination of controlled toughness and fragility, good machine ability, and selectable and controllable corrosion properties, particularly rapid and controlled dissolution in various wellbore fluids. For example, applicants found that by forming a boundary layer surrounding each metallic powder grains at a microstructure level, the modulus and the elastic limit of the metal composites can be greatly increased. The increased modulus and the elasticity enable the metal composites to store more elastic energy before failure. When maximum compressive strength is reached by applying a mechanical or hydraulic force, the stored elastic energy is released breaking the tools or components made from the metal composites. The presence of boundary layer in the metal composites prevents the formation of one major crack and at the same time serves as sites of multiple crack nucleation and propagation, thus the tools or components can break into multiple pieces rather than two pieces. As another advantageous feature, the broken pieces can completely dissolve when exposed to wellbore fluids as a result of the controlled corrosion properties integrated into the metal composites.

In another embodiment, the tools or components made from the metal composites are able to degrade their mechanical strength/ductility and eventually break up without any additional mechanical or hydraulic forces. For example, when contacted with wellbore fluids, the corrosion rate of the metal composites and the nucleation and the development of sub-critical cracks can be controlled in such a way that the tools or components can maintain their geometry with acceptable but degrading mechanical toughness/fragility until they are no longer needed, at which time, the tools and components can break and be easily removed.

Figure 1:
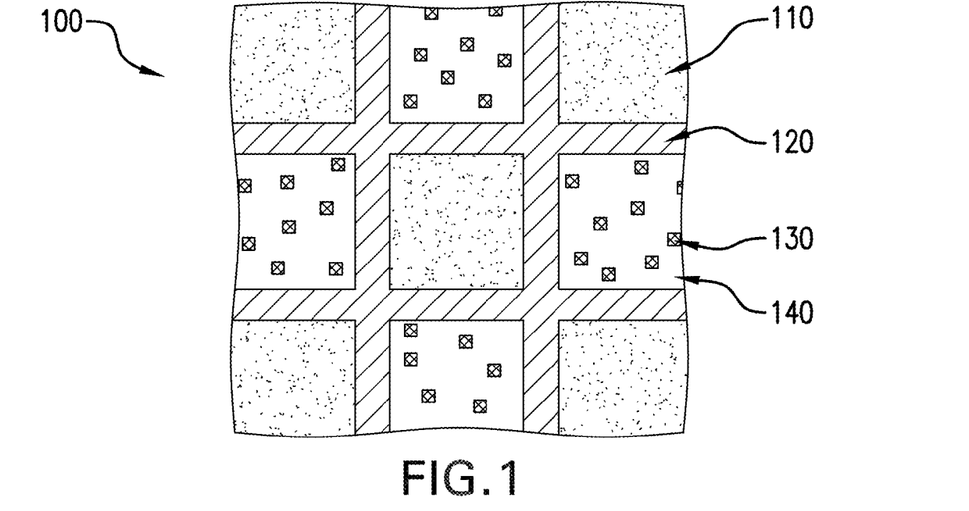
FIG. 1 is a schematic illustration of an exemplary embodiment of a metal composite.
Figure 2:
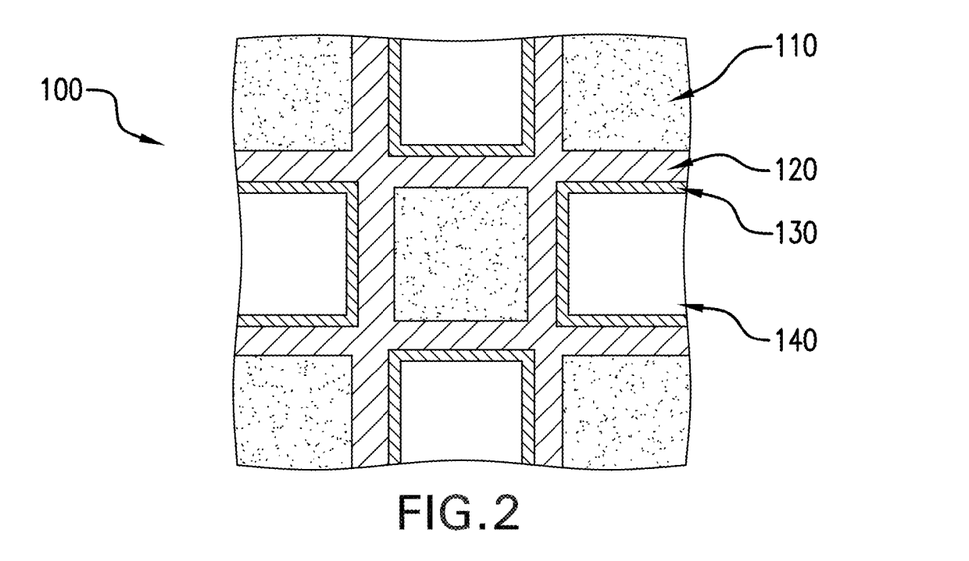
FIG. 2 is a schematic illustration of another exemplary embodiment of a metal composite.
Figure 3A:
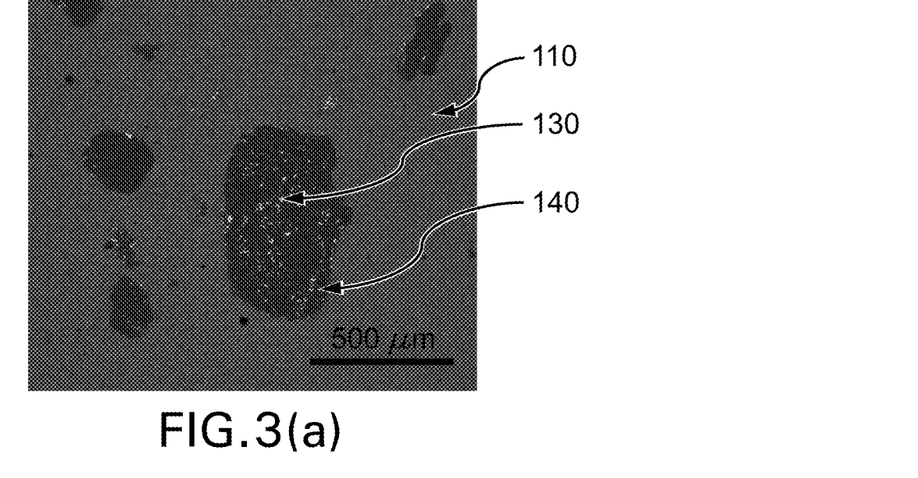
Figure 3B:
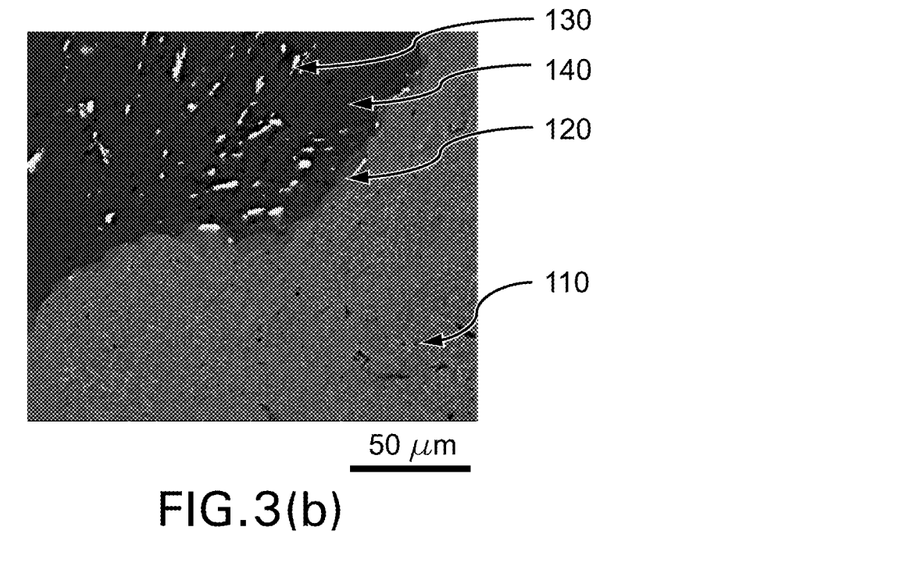
Figure 4A:
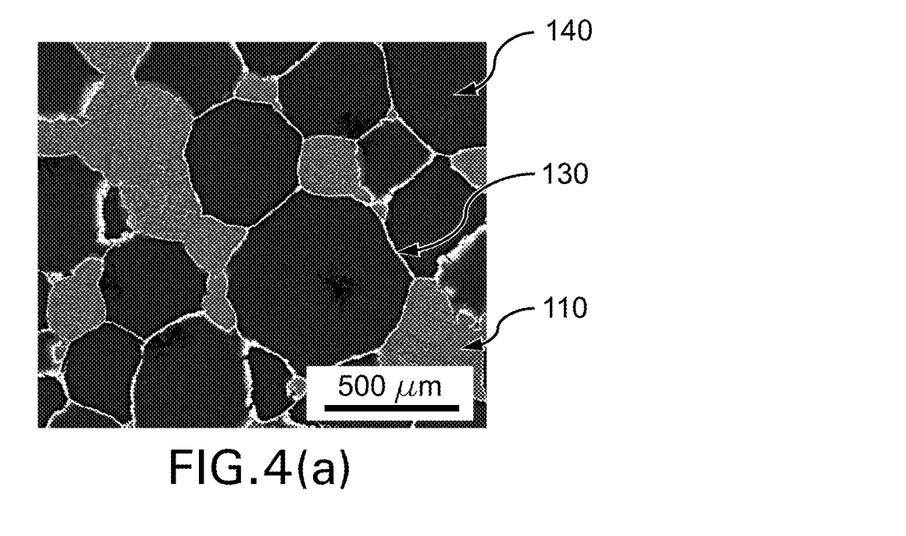
Figure 4B:
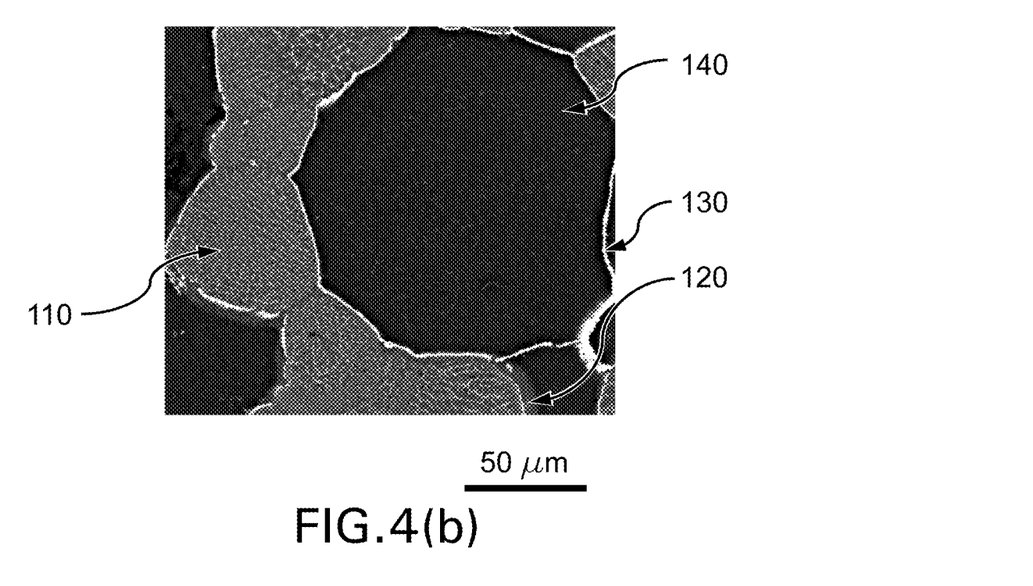
Figure 5A:
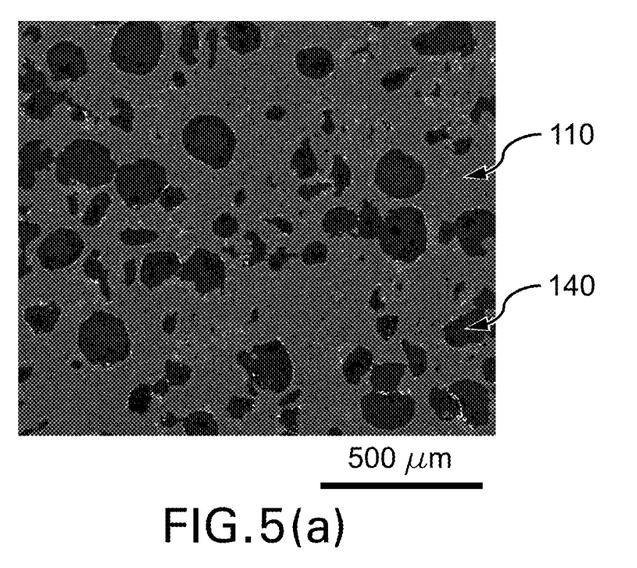
Figure 5B:
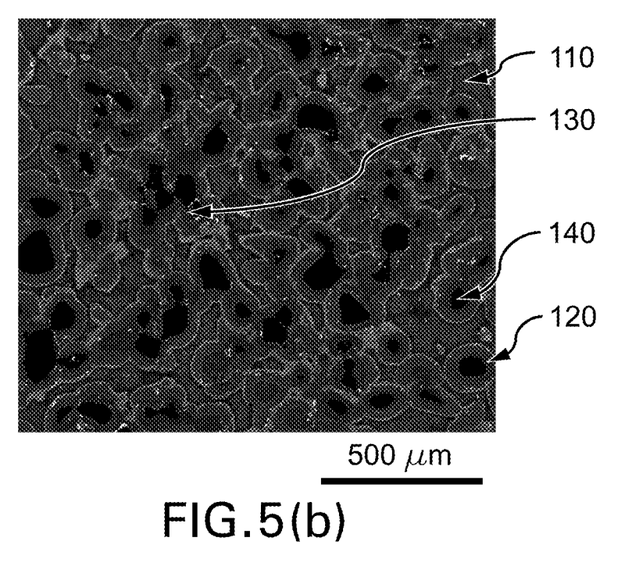

Referring to FIGS. 1 and 5, a metal composite 100 includes a first matrix 140, a second matrix 110, a corrosion reinforcement material 130, and a boundary layer 120. The corrosion reinforcement material 130 can be disposed in matrix 140 as shown in FIGS. 1, 3, and 5. Although not shown, the corrosion reinforcement material 130 can also be disposed in matrix 110 or both matrix 110 and matrix 140. Alternatively, the corrosion reinforcement material 130 can be coated on matrix 140 as shown in FIGS. 2 and 4. Although not shown, the corrosion reinforcement material 130 can be coated on matrix 110 or both matrix 110 and matrix 140.

The first matrix 140 comprises magnesium, either as a pure metal or an alloy. Magnesium alloys include all alloys that have magnesium as an alloy constituent. Magnesium alloys that combine other electrochemically active metals, as alloy constituents are particularly useful, including binary Mg—Zn, and Mg—Al alloys and their alloys alloyed with rare earth metals, thorium, zirconium, lithium, manganese, silver, silicon, yttrium, for example tertiary Mg—Zn—Y alloys. Mg, Zn, and Mn are electrochemically active metals having a standard oxidation potential greater than or equal to that of Zn. These electrochemically active metals are very reactive with a number of common wellbore fluids, including any number of ionic fluids or highly polar fluids, such as those that contain various chlorides. Examples include fluids comprising potassium chloride (KCl), hydrochloric acid (HCl), calcium chloride ($CaCl_2$), calcium bromide ($CaBr_2$) or zinc bromide ($ZnBr_2$). Other useful magnesium alloys include Mg-rare earth metals. Combinations of the metal and metal alloys can be used.

The second matrix 110 comprises an aluminum alloy, steel, a zinc alloy, or a tin alloy. Aluminum alloys include all alloys that have aluminum as an alloy constituent. Exemplary aluminum alloys include Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, where X represents alloying elements including Zn, Mn, Si, Cr, Fe, Ni, Ti, V, Cu, Pb, Bi, and Zr. Combinations of the alloys can be used.

The volume percent of matrix 140 can be 5 to 95 or 10 or 90, based on the total volume of the metal composite. The volume percent of matrix 110 can be 95 to 5, or 90 to 10, based on the total volume of the metal composite.

Corrosion reinforcement materials 130 can be added to the matrix 110, matrix 140, or both to adjust the corrosion rate. Suitable corrosion reinforcement materials include iron, nickel, cobalt, copper, tungsten, silicon, aluminum, zinc, alloys thereof, or a combination comprising at least one of the foregoing corrosion reinforcement materials.

The corrosion reinforcement material 130 can be disposed in matrix 140, matrix 110, or both. Alternatively, the corrosion reinforcement material 130 can be coated on the surface of matrix 140, matrix 110, or both. When the corrosion reinforcement material 130 is coated on matrix 140, it is disposed between the boundary layer 120 and matrix 140. When the corrosion reinforcement material 130 is coated on matrix 110, it is disposed between the boundary layer 120 and matrix 110. In an embodiment, the corrosion reinforcement material is disposed in matrix 140 or coated on the surface of matrix 140.

The corrosion reinforcement coating layer can be a nanoscale coating layer. In an exemplary embodiment, the corrosion reinforcement coating layer may have a thickness of about 25 nm to about 2500 nm. The thickness of corrosion reinforcement coating layer may vary over the surface of 140, 110, or both, but will preferably have a substantially uniform thickness over the surface of 140, 110, or both. The corrosion reinforcement coating layer may include a single layer or a plurality of layers as a multilayer coating structure, for up to four layers. In a single layer coating, or in each of the layers of a multilayer coating, the coating layer may include a single corrosion reinforcement material or may include more than one corrosion reinforcement material. Where a layer includes more than one corrosion reinforcement material, they may have all manner of homogeneous or heterogeneous distributions.

The amount of the corrosion reinforcement material can vary depending on the specific materials used and desired corrosion rate. In an embodiment, the metal composite comprises 0.01 to 10 wt. %, or 0.05 to 8 wt. %, or 0.1 to 6 wt. % of the corrosion reinforcement material, based on the total weight of the metal composite.

Optionally, matrix 110, matrix 140, or both can further comprise a secondary phase such as carbides, nitrides, oxides, precipitates, dispersoids, or the like in order to control the mechanical strength and density of the metal composite.

The metal composite 100 also comprises a boundary layer disposed between matrix 110 and matrix 140. The boundary layer can comprise the metal or metal alloy of the first matrix, the metal or metal alloy of the second matrix, and an intermetallic compound formed from the metal or metal alloy of the first matrix and the metal or metal alloy of the second matrix. The boundary layer can also comprise the same corrosion reinforcement material either dispersed in matrix 110, matrix 140, or both, or coated on the surface of matrix 110, matrix 140, or both. In an embodiment, the boundary layer comprises aluminum, an aluminum alloy, magnesium, a magnesium alloy, (aluminum alloy)$_{49}$Mg$_{32}$, Al$_3$Mg$_2$, Al$_{12}$Mg$_{17}$, or a combination comprising at least one of the foregoing.

The boundary layer can comprise more than one layer or phase. For example, one or more intermetallic layers can form between matrix 110 and 140. In an embodiment, the boundary layer comprises a first layer comprising a solid solution rich in the metal or metal alloys of matrix 110, a second layer comprising a solid solution rich in the metal or metal alloys of matrix 140, and one or more intermetallic layers disposed between matrix 110 and matrix 140, wherein the one or more intermetallic layers comprise intermetallic compounds formed from the metal or metal alloys of matrix 110 and the metal or metal alloys of matrix 140.

Figure 6:
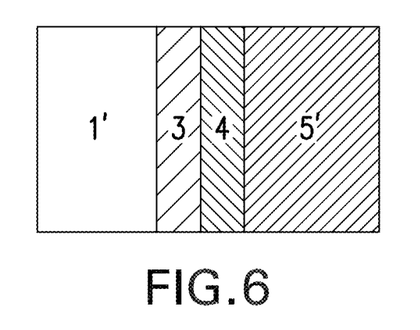
FIG. 6 is a schematic illustration of an exemplary embodiment of a boundary layer.
Figure 7:
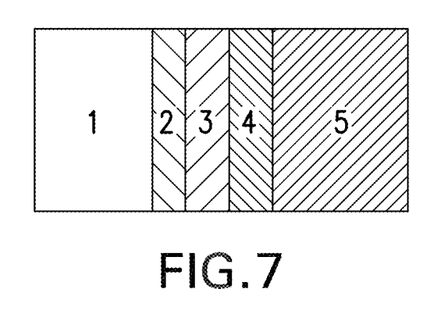
FIG. 7 is a schematic illustration of another exemplary embodiment of a boundary layer.

Two exemplary embodiments of boundary layer 120 are shown in FIGS. 6 and 7. Referring to FIG. 6, the boundary layer comprises 4 layers: layer 1', layer 3, layer 4, and layer 5'. When matrix 110 comprises pure aluminum and matrix 140 comprises pure magnesium, layer 1' comprises aluminum rich Al(Mg) solid solution, layer 3 comprises $Al_{49}Mg_{32}$, layer 4 comprises $Al_{12}Mg_{17}$, and layer 5' comprises magnesium rich Mg(Al) solid solution. Referring to FIG. 7, the boundary layer comprises 5 layers, wherein layer 1 comprises aluminum alloy rich solid solution, layer 2 comprises $(Al\ alloy)_{49}Mg_{32}$, layer 3 comprises $Al_3Mg_2$, layer 4 comprises $Al_{12}Mg_{17}$, and layer 5 comprises magnesium alloy rich solid solution.

The thickness as well as the composition of the boundary layer can be tuned during heat treatment by adjusting the temperature and the duration that the metallic particles are heated. In an embodiment, the boundary layer has a thickness of 10 nm to 200 µm, or 1 to 50 µm.

The boundary layer can be substantially continuous. The use of the term substantially-continuous boundary layer is intended to describe the extensive, regular, continuous, and interconnected nature of the distribution of boundary layer 120 within metal composite 100. As used herein, "substantially-continuous" describes the extension of the boundary layer throughout metal composite 100 such that it extends between and envelopes substantially all of matrix 110 and matrix 140. Substantially-continuous is used to indicate that complete continuity and regular order of the boundary layer around each matrix 110 and matrix 140 is not required.

A method for making the metal composite comprises: disposing a corrosion reinforcement material in a first metallic component, a second metallic component or both; wherein the first metallic component comprises a plurality of particles of magnesium, a magnesium alloy, or a combination thereof; and the second metallic component comprises a plurality of particles of aluminum, an aluminum alloy, steel, a zinc alloy, a tin alloy, or a combination comprising at least one of the foregoing; combining the first metallic component with the second metallic component; and applying a predetermined temperature to the combination thereby forming a metal composite. In another embodiment, the corrosion reinforcement material can be coated on the particles of the first metallic component, the particles of the second metallic component, or the particles of both the first metallic component and the second metallic component.

The particles in the first metallic component and the second metallic component are powder particles. Forming powder particles may be performed by any suitable method known in the art. Suitable powder forming methods include mechanical methods, including machining, milling, impacting and other mechanical methods for forming the metal powder; chemical methods, including chemical decomposition, precipitation from a liquid or gas, solid-solid reactive synthesis and other chemical powder forming methods; atomization methods, including gas atomization, liquid and water atomization, centrifugal atomization, plasma atomization and other atomization methods for forming a powder; and various evaporation and condensation methods. In an exemplary embodiment, particles comprising Mg may be fabricated using an atomization method, such as inert gas atomization.

The particles of the first metallic component and the second metallic component may have any suitable particle size or range of particle sizes or distribution of particle sizes. For example, the particles may be selected to provide an average particle size that is represented by a normal or Gaussian type unimodal distribution around an average or mean. In another example, the particles may be selected or mixed to provide a multimodal distribution of particle sizes, including a plurality of average particle core sizes, such as, for example, a homogeneous bimodal distribution of average particle sizes. The selection of the distribution of particle size may be used to determine, for example, the particle size. In an exemplary embodiment, the particles may have a unimodal distribution and an average particle diameter of about 5 nm to about 300 nm, more particularly about 80 nm to about 120 nm, and even more particularly about 100 nm.

The particles of the first metallic component and the second metallic component may have any suitable particle shape, including any regular or irregular geometric shape, or combinations thereof. For example, the particles can have an acicular shape, a rod-like shape, a dendritic shape, a flake-like shape, a spherical shape, or a nodular shape. In an exemplary embodiment, the particles are substantially spheroidal metal particles.

Disposing corrosion reinforcement material in the first metallic component or the second metallic component can be carried out by blending the reinforcement material with the metal particles of the first metallic component or the metal particles of the second metallic component via any mechanical means.

Depositing or coating corrosion reinforcement material on the plurality of magnesium or magnesium alloy particles may be performed using any suitable deposition method, including various thin film deposition methods, such as, for example, chemical vapor deposition and physical vapor deposition methods. In an exemplary embodiment, depositing corrosion reinforcement material is performed using fluidized bed chemical vapor deposition (FBCVD). Depositing corrosion reinforcement material by FBCVD includes flowing a reactive fluid as a coating medium that includes the desired coating material through a bed of particles fluidized in a reactor vessel under suitable conditions, including temperature, pressure and flow rate conditions and the like, sufficient to induce a chemical reaction of the coating medium to produce the desired corrosion reinforcement material and induce its deposition upon the surface of particles to form coated powder particles. The reactive fluid selected will depend upon the corrosion reinforcement material desired, and will typically comprise an organometallic compound that includes the metallic material to be deposited, such as nickel tetracarbonyl ($Ni(CO)_4$) and tungsten hexafluoride ($WF_6$), that is transported in a carrier fluid, such as helium or argon gas. The reactive fluid, including carrier fluid, causes at least a portion of the plurality of particles to be suspended in the fluid, thereby enabling the entire surface of the suspended particles to be exposed to the reactive fluid, and enabling deposition of the corrosion reinforcement material over the entire surfaces of particles. As also described herein, each metal or metal alloy particles may include a plurality of corrosion reinforcement coating layers. Coating material may be deposited in multiple layers to form a multilayer coating by repeating the step of depositing described above and changing the reactive fluid to provide the desired coating material for each subsequent layer, where each subsequent layer is deposited on the outer surface of particles that already include any previously deposited coating layer or layers that make up corrosion reinforcement material layer.

After the corrosion reinforcement material is incorporated into the first metallic component, the second metallic component, or both, the first metallic component is combined with the second metallic component to provide a combination. The combination comprises a homogeneous dispersion of particles of first metallic component and second metallic component, or a non-homogeneous dispersion of these particles.

A predetermined temperature and a predetermined pressure are then applied to the combination to form a boundary layer. The applying step can include: heating the combination to a predetermined temperature, such as, for example, a temperature sufficient to promote interdiffusion between adjacent particles or a temperature sufficient to promote the formation of an intermetallic compound from adjacent particles; holding the combination at the predetermined temperature for a predetermined hold time, such as, for example, a time sufficient to ensure substantial uniformity of the predetermined temperature throughout the combination; and cooling the metal composite to room temperature. Optionally, a predetermined pressure according to a predetermined pressure schedule or ramp rate sufficient to rapidly achieve full density is applied to the combination while holding the combination at the predetermined temperature.

For certain exemplary embodiments the predetermined temperature is selected to avoid melting of metal particles of the first component and the second component. Accordingly, the predetermined temperature is a temperature less than the melting temperature of the first metallic component and the melting temperature of the second metallic component. As used herein, the melting temperature includes the lowest temperature at which incipient melting or liquation or other forms of partial melting occur within the particles, regardless of whether the particles comprise a pure metal or an alloy with multiple phases having different melting temperatures.

For example, the combination can be heated at a temperature of about 300° C. to about 500° C. or 300° C. to 450° C. for up to about 8 hours or up to 6 hours. The composites can also be formed without heat treatment. When the holding time is zero, it means that after the combination is heated to the target temperature, it is immediately cooled down without holding. The heat treatment can be conducted at atmospheric pressure or a superatmospheric pressure. In an embodiment, the combination is heated without the application of a pressure, followed by application of isostatic pressures, for example, at ramp rates between about 0.5 to about 2 ksi/second to a maximum pressure of about 30 ksi to about 80 ksi. The combination can also be compressed by uniaxial pressing.

Figure 8:
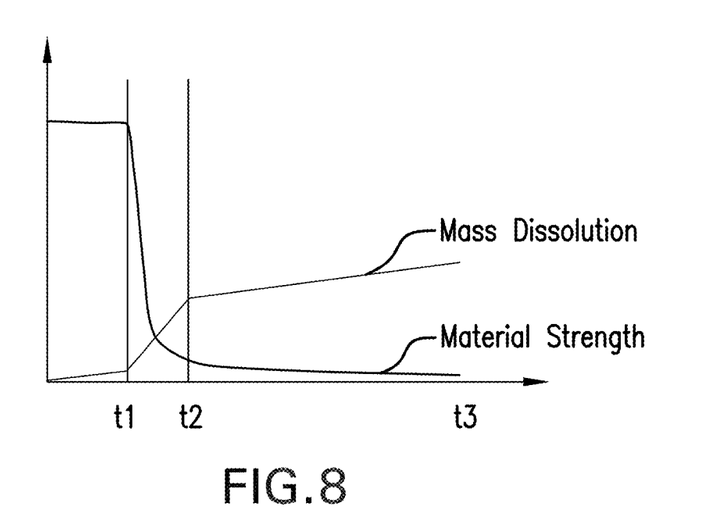
FIG. 8 is a schematic illustration of a change in mass dissolution and material strength of a metal composite as a function of time.
Figure 9:
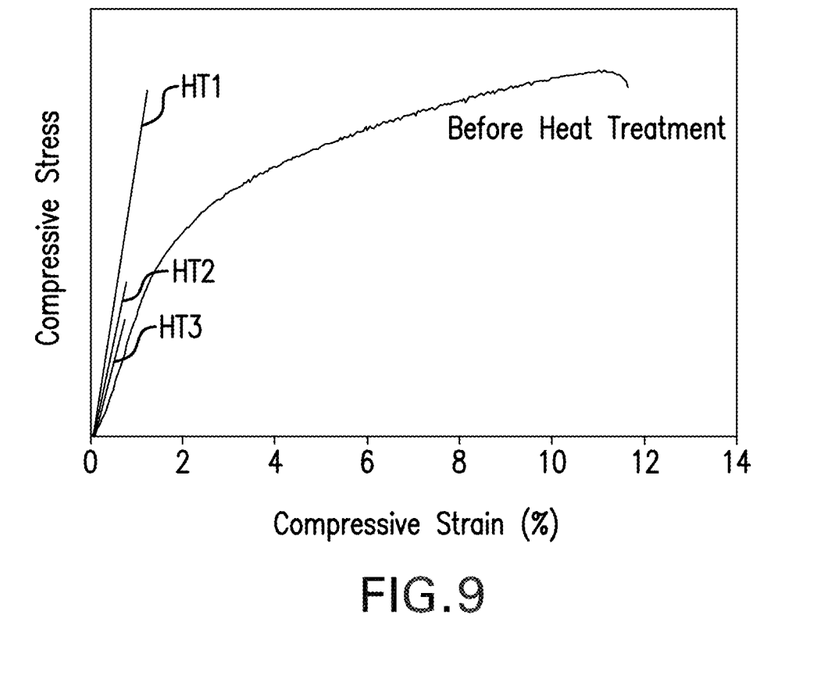
FIG. 9 shows the stress-strain curves of a metal composite fabricated without heat treatment and metal composites heat treated at different temperatures.

The metal composite provides enhanced properties as compared to composites formed from first and second metallic components without heat treatment. FIG. 8 is a schematic illustration of a change in mass dissolution and material strength of a metal composite as a function of time. FIGS. 5(*a*) and 5(*b*) illustrate the structural differences between the metal composite before and after heat treatment. As shown in FIG. 5(*a*), before heat treatment, there is no significant boundary layer between two metallic matrices. As shown in FIG. 5(*b*), heat treatment leads to the formation of a substantially continuous boundary layer 120.

Figure 10:
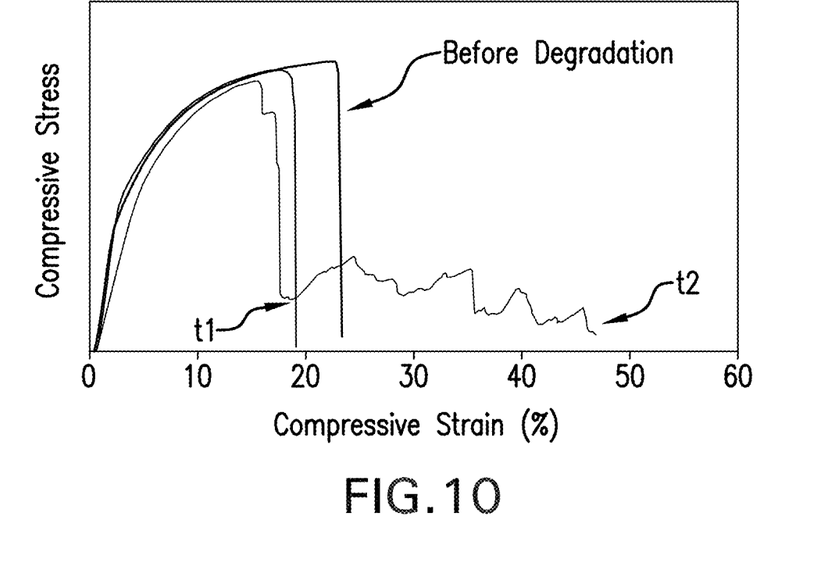
FIG. 10 shows the stress-strain curves of a metal composite after it has been immersed in brine for 2.5 hours (t1) or 4 hours (t2) and a stress-strain curve of a metal composite that is not exposed to brine.
Figure 13:
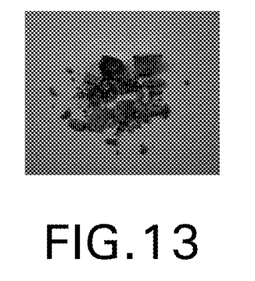
FIG. 13 is a photo of a sample made from a metal composite of the disclosure, wherein the sample is broken into pieces under compression load following immersion in 3% KCl.

The metal composites' toughness/fragility can be engineered by controlling the microstructure of the metal composites through different treatment temperatures. Referring to FIG. 10, the material prepared without heat treatment (as fabricated material) is very ductile and able to deform over 12% without failure. In contrast, the metal composites, which are treated at HT1 (340° C.), HT2 (400° C.) or HT3 (440° C.) for 2 hours, show only about 1% of compressive strain and an article made from the composite material can reach maximum compressive strength without any plastic deformation. The stored elastic energy releases and helps to break the article into multiple pieces. The smaller pieces can finally dissolve themselves completely. FIG. 13 is a photo of a sample made from a heat treated metal composite according to the disclosure, where the sample is broken into pieces under compression load by sudden release of elastic energy.

Figure 11:
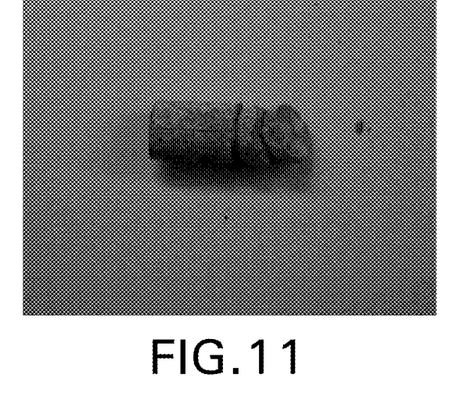
FIG. 11 is a photo of a sample made from a metal composite of the disclosure, wherein the sample is broken up by itself after exposed to brine.
Figure 12:
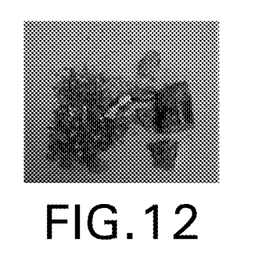
FIG. 12 is a photo of a sample made from a metal composite of the disclosure, where the sample is broken into pieces under compression load by sudden release of elastic energy.

FIG. 11 shows that the metal composites' toughness/fragility can also be changed by immersing the sample in brine for different times. For example, the composite formed without the heat treatment is ductile and able to deform over 20% without failure. After the composite is placed in 3% KCl, the strength of the composite is degraded quickly and a sample of the metal composite can break up into pieces by itself. FIG. 12 is a photo of a sample made from a metal composite where the sample breaks into pieces after it is exposed to brine for a certain amount of time. No external force is applied to the sample. FIG. 14 is a photo of a sample made from a metal composite of the disclosure, wherein the sample is broken into pieces under compression load following immersion in 3% KCl.

Shaped, formed, machined, forged, or molded articles comprising the metal composites are also provided. The metal composites can be pressed into useful shaped articles by a variety of means such as hot pressing and low-temperature sintering to form articles such as, for example, downhole articles such as a ball, a ball seat, a fracture plug, a bridge plug, a wiper plug, shear out plugs, a debris barrier, an atmospheric chamber disc, a swabbing element protector, a sealbore protector, a screen protector, a beaded screen protector, a screen basepipe plugs, a drill in stim liner plugs, ICD plugs, a flapper valve, a gaslift valve, a transmatic CEM plug, float shoes, darts, diverter balls, shifting/setting balls, ball seats, sleeves, teleperf disks, direct connect disks, drill-in liner disks, fluid loss control flappers, shear pins or screws, cementing plugs, teleperf plugs, drill in sand control beaded screen plugs, HP beaded frac screen plugs, hold down dogs and springs, a seal bore protector, a stimcoat screen protector, or a liner port plug.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A metal composite comprising:
  a first matrix comprising magnesium, a magnesium alloy, or a combination thereof;
  a second matrix compositionally different from the first matrix and comprising aluminum, an aluminum alloy, steel, a zinc alloy, a tin alloy, or a combination comprising at least one of the foregoing;
  a corrosion reinforcement material dispersed in the first matrix, the second matrix, or both the first matrix and the second matrix; the corrosion reinforcement material comprising Fe, Ni, Co, Cu, W, Si, Al, Zn, alloys thereof, or a combination comprising at least one of the foregoing; and
  a boundary layer disposed between the first matrix and the second matrix;
  wherein the boundary layer has a thickness of 10 nm to 200 μm and comprises an intermetallic compound formed from the magnesium or magnesium alloy of the first matrix and a metal or metal alloy of the second matrix.

2. The metal composite of claim 1, wherein the first matrix comprises a magnesium alloy selected from Mg—Al alloy, Mg—Zn alloy, Mg—Mn alloy, Mg-rare earth metals alloy, Mg—Zn—Y alloy, and a combination comprising at least one of the foregoing alloys.

3. The metal composite of claim 1, wherein the second matrix comprises Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, or a combination comprising at least one of the foregoing, wherein X is Zn, Mn, Si, Cr, Fe, Ni, Ti, V, Cu, Pb, Bi, Zr, or a combination comprising at least one of the foregoing.

4. The metal composite of claim 1, wherein the corrosion reinforcement material is dispersed in the first matrix.

5. The metal composite of claim 1, wherein the boundary layer consists of the magnesium or magnesium alloy of the first matrix, the metal or metal alloy of the second matrix, and an intermetallic compound formed from the magnesium or magnesium alloy of the first matrix and the metal or metal alloy of the second matrix.

6. The metal composite of claim 1, wherein the boundary layer further comprises the corrosion reinforcement material.

7. The metal composite of claim 1, wherein the first matrix comprises magnesium, the second matrix comprises aluminum, and the boundary layer comprises aluminum, $Al_3Mg_2$, $Al_{12}Mg_{17}$, and magnesium.

8. The metal composite of claim 1, wherein the first matrix comprises a magnesium alloy, the second matrix comprises an aluminum alloy, and the boundary layer comprises the magnesium alloy, the aluminum alloy, (aluminum alloy)$_{49}Mg_{32}$, $Al_3Mg_2$, $Al_{12}Mg_{17}$, and the magnesium alloy.

9. The metal composite of claim 1, wherein the boundary layer has a thickness of 1 to 50 μm.

10. The metal composite of claim 9, wherein the metal composite comprises 5 to 95 volume percent of the first matrix, and 95 to 5 volume percent of the second matrix, each based on the total volume of the metal composite.

11. The metal composite of claim 10, wherein the metal composite comprises 0.01 to 10 wt. % of the corrosion reinforcement material, based on the total weight of the metal composite.

12. The metal composite of claim 1, wherein the boundary layer is substantially continuous.

13. The metal composite of claim 1, wherein the boundary layer is continuous and the first matrix and the second matrix are discontinuous.

14. The metal composite of claim 1, wherein the second matrix comprises an aluminum alloy, steel, a zinc alloy, a tin alloy, or a combination comprising at least one of the foregoing.

15. The metal composite of claim 1, wherein the first matrix, the second matrix or both the first matrix and the second matrix further comprise a secondary phase, the second phase comprising carbides, nitrides, oxides, precipitates, dispersoids, or a combination comprising at least one of the foregoing.

16. The metal composite of claim 1, wherein the first matrix comprises a magnesium alloy, the second matrix comprises an aluminum alloy, and the boundary layer consists of the magnesium alloy, the aluminum alloy, and one or more intermetallic compound formed from the magnesium or magnesium alloy of the first matrix and the aluminum or aluminum alloy of the second matrix.

17. A metal composite comprising:
  10 to 90 volume percent of first matrix comprising a magnesium alloy based on the total volume of the metal composite;
  90 to 10 volume percent of a second matrix compositionally different from the first matrix and comprising an aluminum alloy based on the total volume of the metal composite;
  0.01 to 10 wt % of a corrosion reinforcement material comprising Fe, Ni, Co, Cu, W, Si, Zn, alloys thereof, or a combination comprising at least one of the foregoing, based on the total weight of the metal composite; the corrosion reinforcement material dispersed in the first matrix, the second matrix, or both the first matrix and the second matrix and
  a boundary layer disposed between the first matrix and the second matrix; the boundary layer having a thickness of 1 micron to 50 microns and comprising an intermetallic compound formed from magnesium or the magnesium alloy of the first matrix and aluminum or the aluminum alloy of the second matrix.

18. The metal composite of claim 17, wherein the corrosion reinforcement material is further disposed between the boundary layer and the first matrix.

19. The metal composite of claim 17, wherein the corrosion reinforcement material is further disposed between the boundary layer and the second matrix.

20. The metal composite of claim 17, wherein the corrosion reinforcement material is dispersed in the first matrix.

21. The metal composite of claim 17, wherein the corrosion reinforcement material is dispersed in the first matrix.

22. The metal composite of claim 17, wherein the boundary layer consists of the magnesium alloy, the aluminum alloy, and the intermetallic compound.

23. The metal composite of claim 17, wherein the boundary layer is substantially continuous.

24. The metal composite of claim 17, wherein the metal composite comprises 0.1 to 6 wt. % of the corrosion reinforcement material, based on the total weight of the metal composite.

25. A method of making a metal composite according to claim 1, the method comprising:

dispersing a corrosion reinforcement material in a first metallic component, a second metallic component or both; wherein the first metallic component comprises a plurality of particles of magnesium, a magnesium alloy, or a combination thereof; and the second metallic component comprises a plurality of particles of aluminum, an aluminum alloy, steel, a zinc alloy, a tin alloy, or a combination comprising at least one of the foregoing;

combining the first metallic component with the second metallic component; and applying a predetermined temperature to the combination thereby forming a metal composite according to claim 1.

26. The method of claim 25, wherein the predetermined temperature is a temperature less than the melting temperature of the first metallic component and the melting temperature of the second metallic component.

27. The method of claim 25, comprising applying a predetermined temperature of 300 to 500° C. for up to 8 hours to the combination.

* * * * *